Nov. 23, 1948.   E. E. HURST ET AL   2,454,388
DRAFTING EQUIPMENT
Filed Aug. 20, 1945   5 Sheets-Sheet 1
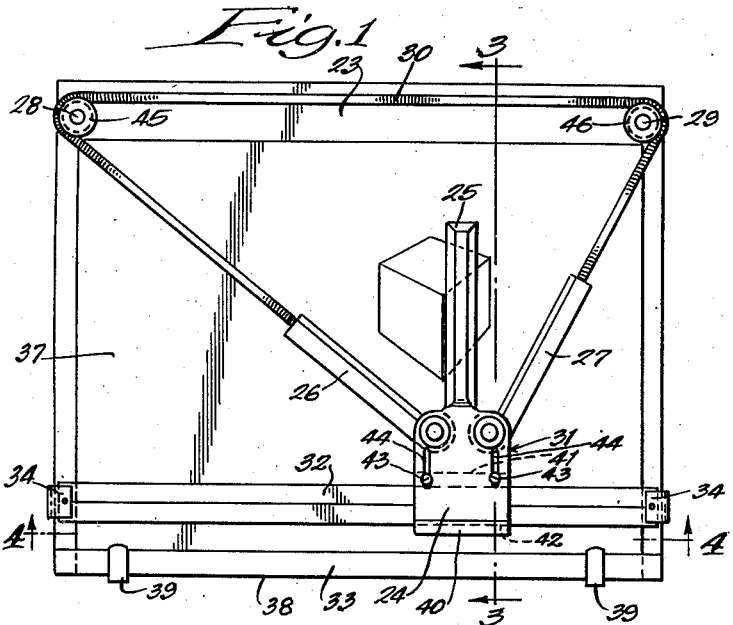
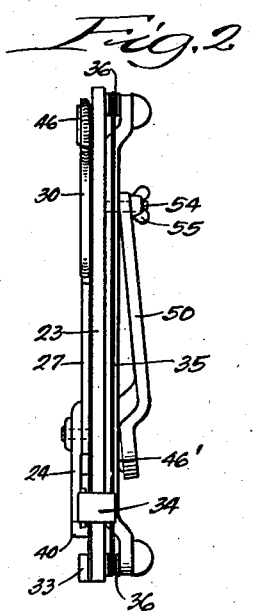
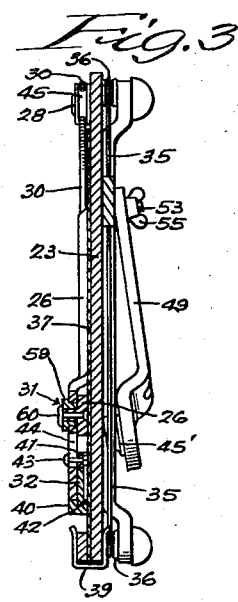
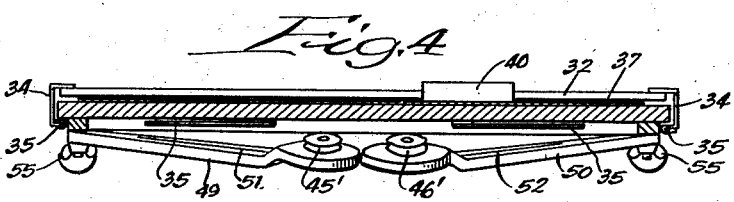
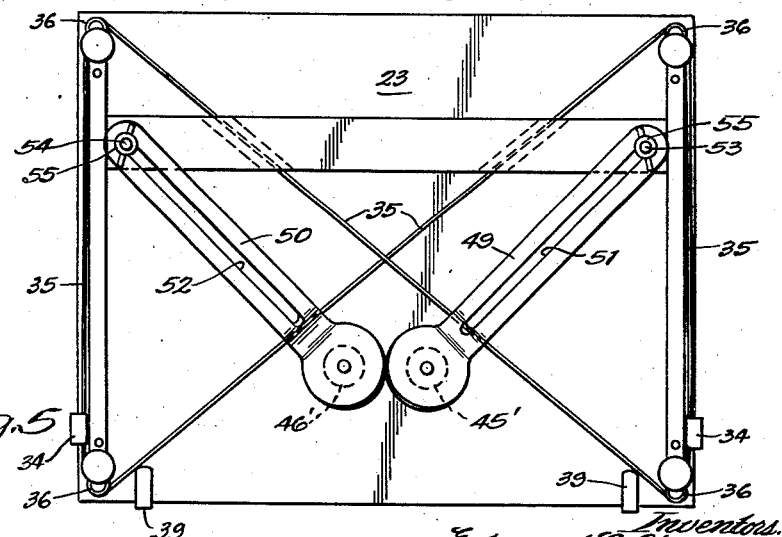
Inventors:
Edmund E. Hurst and
John W. Paxton.
By Soans, Pond & Anderson
Attorneys.

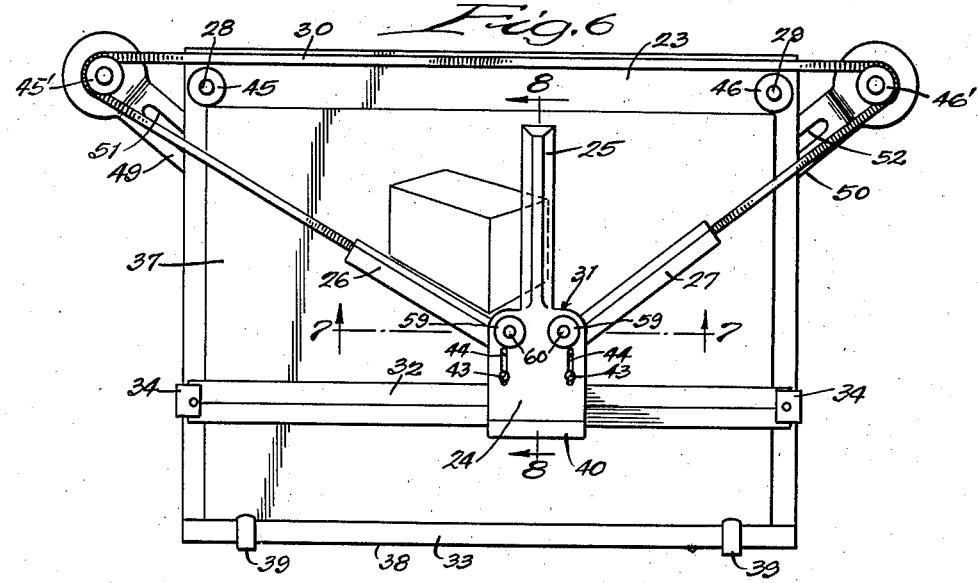
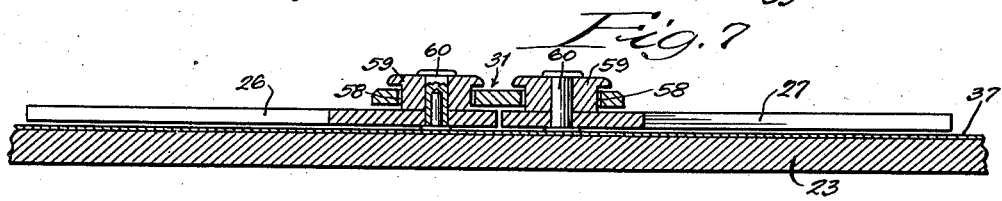
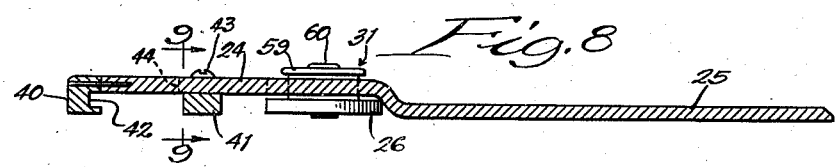
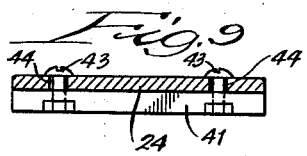

Nov. 23, 1948.  E. E. HURST ET AL  2,454,388
DRAFTING EQUIPMENT
Filed Aug. 20, 1945  5 Sheets-Sheet 3
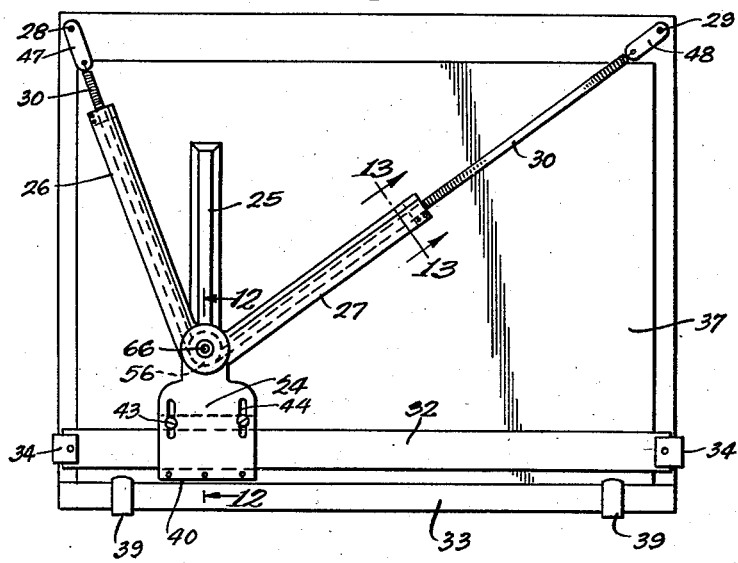
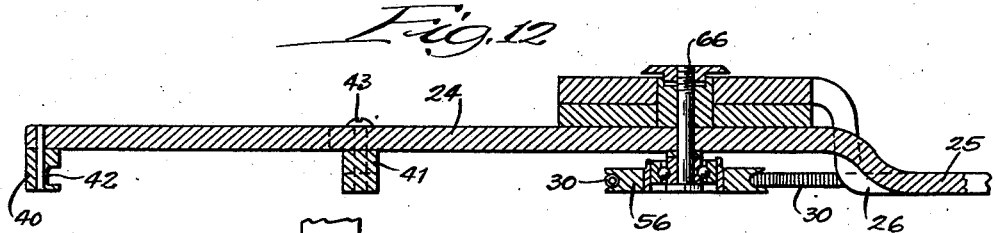
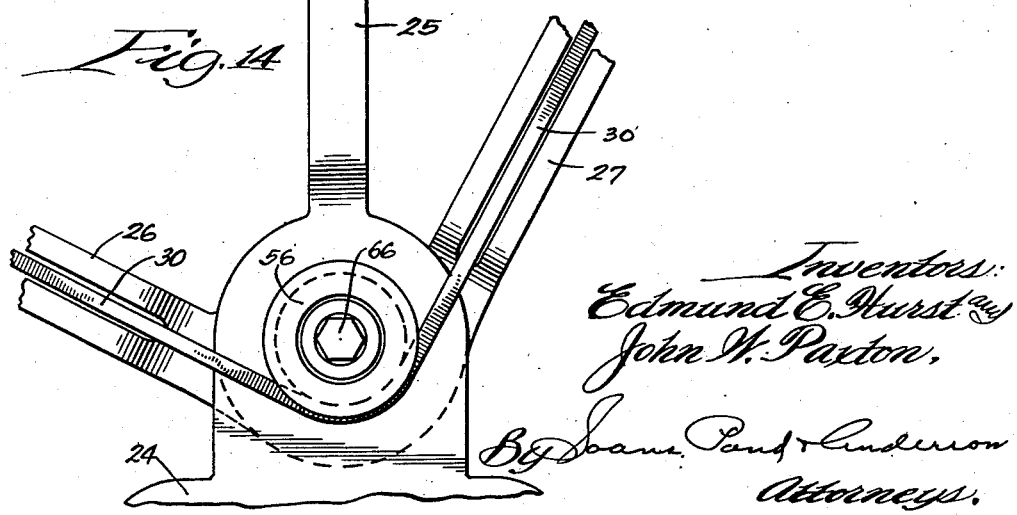

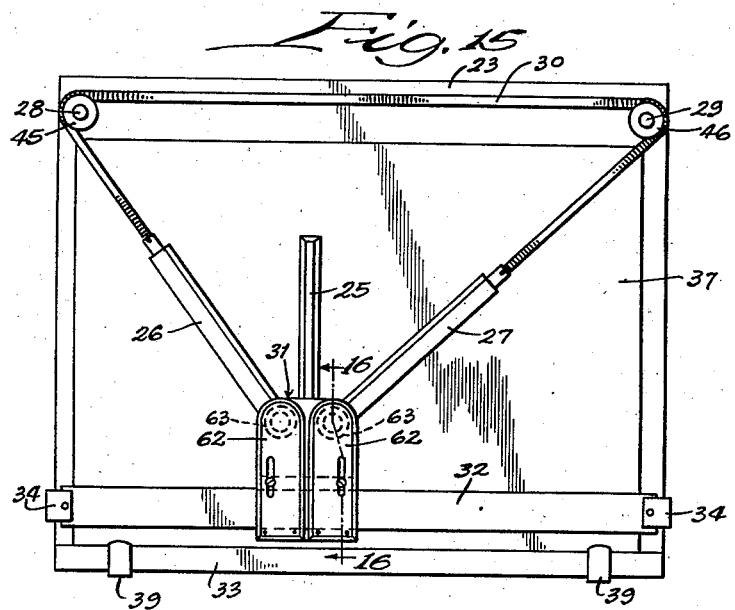
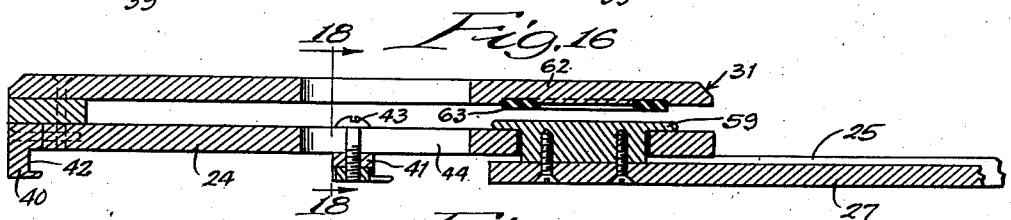
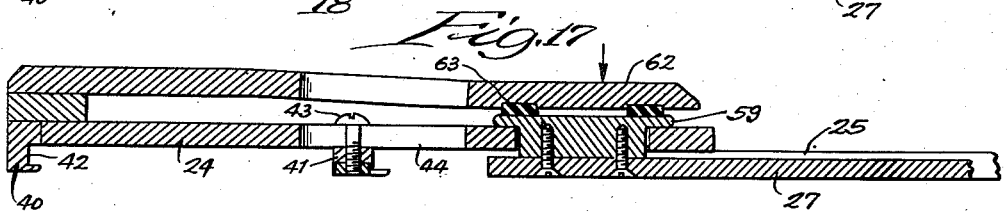
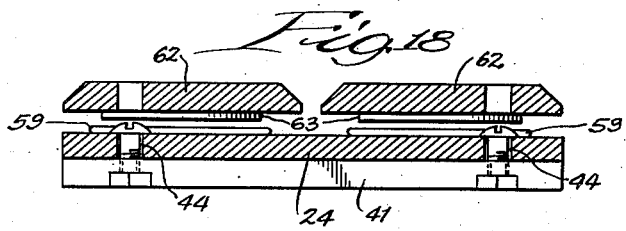

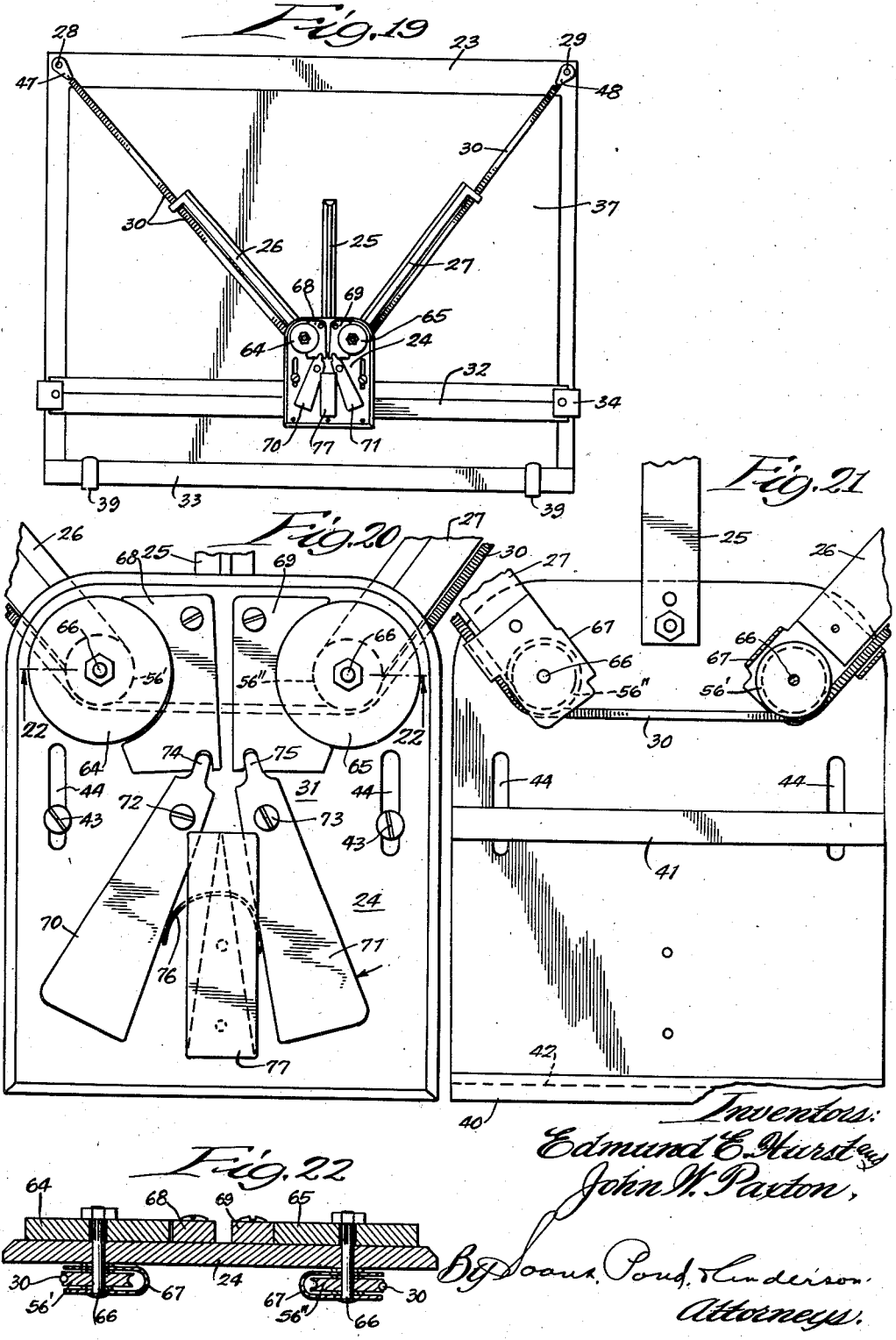

Patented Nov. 23, 1948

2,454,388

UNITED STATES PATENT OFFICE 2,454,388

DRAFTING EQUIPMENT

Edmund E. Hurst and John Warren Paxton, Bloomington, Ill., assignors of one-third to Francis Lee Goff, Bloomington, Ill.

Application August 20, 1945, Serial No. 611,516

12 Claims. (Cl. 33—77)

This invention relates to drafting equipment for use in drawing perspective views.

The main objects of the invention are to provide an improved form of simple and easily-used drafting equipment for the drawing of perspective views; to provide improved equipment of this kind which may be readily attached to and used in connection with the conventional drafting board; to provide an improved construction and relative arrangement of straight edges for respectively determining the vertical and the oppositely-converging diagonal lines of a perspective view; to provide improved means for mounting said straight edges for horizontal shifting on the normally vertically-movable drafting-board straight edge and connecting said diagonal straight edges to vanishing points whereby the diagonal straight edges always assume the proper relationship to each other and to the vertical straight edge so as to correctly represent the perspective angles as the said straight edges are shifted on the drafting board; to provide improved means for extending the vanishing point connections beyond the normal boundary of the drafting board; and to provide improved means for retaining said diagonal straight edges in position against incidental shifting during the drawing of lines.

Preferred forms of perspective drafting equipment, constructed in accordance with this invention, are shown in the accompanying drawings, in which Fig. 1 is a plan view of one form of perspective drafting equipment applied to a conventional type of drafting board;

Fig. 2 is a side elevation of the same;

Fig. 3 is a cross-sectional view taken on the line 3—3 of Fig. 1;

Fig. 4 is a similar view taken on the line 4—4 of Fig. 1;

Fig. 5 is a reverse view of the arrangement shown in Fig. 1;

Fig. 6 is a view similar to Fig. 1 but showing the use of auxiliary arms by which the vanishing point means are extended beyond the border of the normal drawing board;

Fig. 7 is an enlarged, fragmentary, cross-sectional view taken on the line 7—7 of Fig. 6;

Fig. 8 is a similar view on the line 8—8 of Fig. 6;

Fig. 9 is a transverse sectional view taken on the line 9—9 of Fig. 8;

Fig. 10 is a perspective of one end of one of the diagonal straight edges, showing the formation of the pin to which is attached one end of the flexible connection which co-acts with the vanishing point means for controlling the positions of the diagonal straight edges;

Fig. 11 is a plan view similar to Fig. 1 but showing a modified pivotal mounting of the diagonal straight edges and a modification of vanishing-point means and the connection of the diagonal straight edges thereto;

Fig. 12 is an enlarged, fragmentary, cross-sectional view taken on the line 12—12 of Fig. 11;

Fig. 13 is an enlarged, fragmentary, cross-sectional view taken on the line 13—13 of Fig. 11;

Fig. 14 is an enlarged, fragmentary, reverse view of the pivotal arrangement of the diagonal straight edges employed in the embodiment shown in Fig. 11;

Fig. 15 is a view similar to Fig. 1 but showing an addition of means for retaining the diagonal straight edges in temporary fixed position during the drawing of lines;

Fig. 16 is an enlarged, fragmentary, cross-sectional view taken on the line 16—16 of Fig. 15;

Fig. 17 is a view similar to Fig. 16 but showing the retaining means depressed;

Fig. 18 is an enlarged, cross-sectional view taken on the line 18—18 of Fig. 16;

Fig. 19 shows a further modification in the retaining means by which the diagonal straight edges may be temporarily held in place during the ruling of lines;

Fig. 20 is an enlarged plan view of said retaining means;

Fig. 21 is a reverse view of the parts shown in Fig. 20; and

Fig. 22 is a cross-sectional view taken on the line 22—22 of Fig. 20.

Perspective drafting equipment, constructed in accordance with any of the preferred embodiments herein shown, is designed for use with a drafting board 23 and comprises a plate 24 on which is arranged the straight edges 25, 26, and 27, the two latter of which have their ends connected to vanishing-point means 28 and 29 through the medium of a flexible connection 30 and which may be firmly retained against incidental displacement, during the drawing of lines, by means of suitable retaining means 31.

The drafting board 23 may be of any conventional construction, using wood or plastic, equipped with a horizontally-disposed straight edge 32 movable vertically on the board and provided with clamping means 33 whereby drawing paper is secured in proper position on the board.

The drawing board 23, with which the several embodiments of this perspective equipment have been combined, is of plastic construction. The straight edge 32 has clips 34 fixed at the ends thereof which extend over the lateral edges of the board. These clips are secured to a cable 35 (see Figs. 4 and 5) which passes around rollers 36, located at the corners of the board 23 on the back thereof, and which is crossed as indicated in Fig. 5. Such a cable connection ensures the straight edge 32 being held perfectly normal to its vertical during movement on the board.

The board 23 being of plastic material, it is necessary to provide some other means than thumb tacks for holding the paper 37 in place. To that end there is provided the clamping means 33 in the form of a bar 38 which is held in place by means of a pair of spring clips 39.

The plate 24 of the perspective equipment likewise is preferably of some plastic material. The exact form of this plate may be varied depending upon how the straight edges 25, 26, and 27 are to be mounted thereon and connected to the vanishing-point means 28 and 29. Regardless of the form of the plate 24 to accommodate the arrangement of the straight edges 25, 26, and 27 and the vanishing-point attachments, such a plate is provided with a pair of bars 40 and 41 relatively adjustable on the plate so that the plate may be slidably clamped in fixed normal relationship to straight edges 32 of varying widths. To that end, the bar 40 is grooved at 42 (see Fig. 3) to fit under the rear or lower edge of the straight edge 32. The bar 41 is supported on the plate 24 by means of threaded pins 43 extending through slots 44 so that the bar 41 can be properly positioned against the other edge of the straight edge 32.

The vertical straight edge 25 may be integral with the plate 24, as shown in several of the embodiments, or it may be separately formed and rigidly attached, as shown in Figs. 19, 20, and 21. In any event, it is positioned so that it is perpendicular to the straight edge 32 and obviously is used for the drawing of all vertical lines involved in a perspective view, such as illustrated in Figs. 1 and 6.

The straight edges 26 and 27 are pivotally connected at their lower ends to the plate 24. This may be by means of separate pivots, as shown in most of the embodiments, or by a single pivot, as shown in Figs. 11, 12, and 13. This pair of straight edges, being designed to guide the drawing of the oppositely-converging diagonals of a perspective, of necessity must always be alined with the respective vanishing points of a perspective, regardless of the position of the plate 24 on the straight edge 32 or the position of the straight edge 32 vertically on the board 23. Accordingly, it is necessary to provide a flexible connection between the outer ends of the pair of straight edges 26 and 27 and the vanishing-point means 28 and 29.

Generally, the vanishing-point means 28 and 29, with which the straight edges 26 and 27 must be constantly alined, normally would be fixed on the board 23. However, there are occasions when it is desirable to have these vanishing-point means located beyond the perimeter of the board 23 so as to keep the straight edges 26 and 27 in proper relative relationship to each other and to the straight edge 25 when it is necessary to carry the formation of vertical and diagonal lines at the extreme upper portions of the drawing paper 37.

In the preferred embodiment of this invention the vanishing-point means 28 and 29 are in the form of rollers 45 and 46 journalled adjacent to the upper corners of the board 23. In the modified embodiments shown in Figs. 11 and 19 they are in the form of clips 47 and 48 pivoted adjacent to the upper corners respectively of the board 23.

In order to position the vanishing-point means 28 and 29 beyond the perimeter of the board 23 there has been provided a pair of auxiliary rollers 45' and 46' mounted on the outer ends of arms 49 and 50, respectively. These arms are formed with slots 51 and 52 through which extend pivot pins 53 and 54, respectively, whereby said arms 49 and 50 are pivotally supported on the back of the board 23. The arms 49 and 50 may be clamped in extended positions as shown in Fig. 6, or in retracted positions as shown in Fig. 5, by means of the winged thumb-nuts 54 and 55 mounted on the pivot pins 53 and 54.

The alinement of the straight edges 26 and 27 with the vanishing points is effected by means of a flexible connection 30. Preferably this is in the form of a coiled wire spring which, in the embodiment shown in Figs. 1 to 8, has the ends connected to the straight edges 26 and 27 so that the intermediate part thereof forms a loop which extends around the rollers 45 and 46—or 45' and 46'. In the embodiment shown in Figs. 11 to 21, the flexible connection 30 has its ends connected to the clips 47 and 48 and the intermediate part thereof forms a loop which extends around a single roller 56, as in the embodiment shown in Figs. 11, 12, and 14, or around a pair of rollers 56' and 56'', as in the embodiment shown in Figs. 19 to 22.

In the embodiment shown in Figs. 1 to 8, the diagonal straight edges 26 and 27 have a pin 57 formed on the outer ends thereof to which the end of the spring is secured.

As an alternative to providing a flexible connection of the type and arrangement herein shown, cables could be used extending from the outer ends of the diagonal straight edges 26 and 27 over rollers suitably mounted on the board to represent the vanishing points 28 and 29 and connected to weights.

The straight edges 25, 26, and 27 are beveled, as clearly shown in the figures, so as to facilitate the drawing of lines on the paper 37 in the closest possible proximity to the edges of the respective parts.

Because of the flexible connection of the diagonal arms 26 and 27 to the vanishing-point means 28 and 29, it is necessary to so arrange the mounting of the arms 26 and 27 on the plate 24 that they may be most conveniently held against incidental displacement during the drawing of lines along their edges. The drawings illustrate several ways in which this may be effected. In the embodiment shown in Figs. 1 to 5, this retaining means 31 is provided by having the shank 58 of a bushing 59 extended through suitable openings in each of the arms 26 and 27 and secured in fixed relationship to the respective arm by means of a pin 60. The bushings 59 thus form bearings for the pivotal connection of the straight edges 26 and 27 to the plate 24, and the flange parts of the bushings extend above the plate 24. Thus, in this modification, when it is desired to temporarily secure one of the straight edges 26 or 27 against displacement while drawing a line therealong, it is only necessary to press with the finger of one hand down upon the proper bushing 59, thus pressing the respective arm fairly firmly against the paper. Thereupon, with reasonable care, a line may be drawn along the straight edge without causing any disalinement of the straight edge with its respective vanishing point.

In the embodiment shown in Figs. 15 to 16, the retaining means 31 employs a pair of arms 61 and 62 mounted along their base edges to the base edge of the plate 24 so that the outer ends of the arms are disposed above the bushings 59 which are fixed to the straight edges 26 and 27. A washer 63 of friction material is located on the under faces of the outer ends of the arms 61 and 62 concentrically of the bushings 58 so that when the outer ends of said arms are depressed to bring the friction washers 63 into engagement with the transverse flange of the bushings 58, the straight edges 26 and 27 are held against incidental displacement.

In the modification of the retaining means shown in Figs. 19 to 22, discs 64 and 65 are secured, by means of pins 66, to brackets 67 which in turn support the straight edges 26 and 27. Intermediate these discs 64 and 65 are pivotally mounted a pair of friction blocks 68 and 69. These are movable into and out of frictional clamping engagement with the respective discs 64 and 65 by means of arms 70 and 71, pivoted at 72 and 73 and having tongues 74 and 75 engaged in suitable recesses in the respective brake shoes 68 and 69. A spring 76 mounted on a nob 77, fixed to the plate 24, contacts the arms 70 and 71 and normally shifts them so as to retract the respective friction blocks 68 and 69.

For the modification shown in Figs. 11 to 14, the temporary retention of the straight edges 26 and 27 against incidental displacement is effected simply by pressing that portion of the straight edge 26, contiguous with the pivot pin 66, against the concentric portion of the straight edge 27 and against the plate 24.

The operation of this equipment is thought to be more or less obvious from the foregoing description and, therefore, not to require detailed explanation.

Once the station point for a particular perspective view has been determined, the plate 24 is placed in position so as to draw the main central vertical line along the vertical straight edge 25. On this the upper and lower points from which the diagonals diverge to the vanishing points are determined. Thereupon the plate 24, when shifted relative to the straight edge 32 and the straight edge 32 is shifted on the board 23, will bring first one and then the other of the straight edges 26 and 27 to intersect the vertical line at these critical points. Thereupon the main diagonal lines may be drawn. Subsequently the points along the diagonals at which the two extreme verticals are to be drawn are determined, and the parts moved to bring the vertical straight edge 25 in position to permit the drawing of such lines.

Depending upon the nature of the object to be drawn in perspective, the plate 24 is moved back and forth on the straight edge 32, and the straight edge 32 is moved up and down the board 23 to successively bring one or the other of the straight edges 25, 26, and 27 into proper position to draw the corresponding detail lines of the figure.

In all of the shifting of the straight-edges 26 and 27 relative to each other and to the straight-edge 32, or in their shifting with the straight-edge 32, the spring 30 is constantly kept in tension but is free to shift relative either to the vanishing point means 28 and 29 or to the pivoted ends of the straight-edges 26 and 27.

When the straight edge 25 is once positioned for the drawing of a vertical line, it can be readily held against incidental displacement by simply pressing the plate 24 into contact with the drawing support 23. When one of the diagonal straight edges 26 or 27 is positioned for drawing a diagonal line, it may be held against incidental displacement by depressing one of the parts of any one of the several modifications, of the retaining means 31, which have been hereinbefore described.

Variations and modifications in the details of structure and arrangement of the parts may be resorted to within the spirit and coverage of the appended claims.

We claim:

1. Drafting equipment of the class described comprising, a support providing a drafting surface, means mounted on said support and movable in a plane parallel to said drafting surface between opposite edges of said support, a pair of straight-edges pivotally attached to said means, a flexible element connected to said straight-edges at the ends opposite said pivots and forming a loop between said ends, and a pair of means attachable to said support at spaced points thereon and adapted to engage said flexible element so as to keep the loop thereof in tension between said pair of straight-edge ends but freely shiftable relative to said pair of attachable means so as to automatically effect the variable divergent disposition of said straight-edges when said first-mentioned means is moved about said drafting surface.

2. Drafting equipment of the class described comprising, a support providing a drafting surface, means mounted on said support and movable in a plane parallel to said drafting surface between opposite edges of said support, a pair of straight-edges pivotally attached to said means, a coiled spring connected to said straight-edges at the ends opposite said pivots and forming a loop between said ends, and a pair of means attachable to said support at spaced points thereon and adapted to engage said coiled spring so as to keep the loop thereof in tension between said pair of straight-edge ends but freely shiftable relative to said pair of attachable means so as to automatically effect the variable divergent disposition of said straight-edges when said first-mentioned means is moved about said drafting surface.

3. Drafting equipment of the class described comprising, a support providing a drafting surface, means mounted on said support and movable in a plane parallel to said drafting surface between opposite edges of said support, a pair of straight-edges pivotally attached to said means, a flexible element connected to said straight edges at the ends opposite said pivots and forming a loop between said ends, and a pair of means mounted on arms adjustably attached to said support so as to position said pair of means beyond the normal perimeter of said support and adapted to engage said flexible element so as to keep the loop thereof in tension between said pair of straight-edge ends but freely shiftable relative to said pair of attachable means so as to automatically effect the variable divergent disposition of said straight-edges when said first-mentioned means is moved about said drafting surface.

4. Drafting equipment of the class described comprising, a support providing a drafting surface, means mounted on said support and movable in a plane parallel to said drafting surface between opposite edges of said support, a member detachably connected to said means, a pair of straight-edges pivotally attached to said member, a flexible element connected to said straight edges at the ends opposite said pivots and forming a loop between said ends, and a pair of means attachable to said support at spaced points thereon and adapted to engage said flexible element so as to keep the loop thereof in tension between said pair of straight-edge ends but freely shiftable relative to said pair of attachable means so as to automatically effect the variable divergent disposition of said straight-edges when said first-mentioned means is moved about said drafting surface.

5. A drafting equipment of the class described comprising, a support providing a drafting surface, a horizontal straight-edge mounted for movement in a plane parallel to said drafting surface between opposite edges of said support, a member shiftably mounted longitudinally of said straight-edge, a pair of straight-edges pivotally attached to said member, a flexible element connected to said straight-edges at the ends opposite said pivots and forming a loop between said ends, and a pair of means attachable at spaced points on said support and adapted to engage said flexible elements so as to keep the loop thereof in tension between said pair of straight-edge ends but freely shiftable relative to said attachable means so as to effect the variable divergent disposition of said pair of straight-edges when said horizontal straight-edge and member are moved about said drafting surface.

6. Drafting equipment of the class described comprising, a support providing a drafting surface, means mounted on said support and movable in a plane parallel to said drafting surface between opposite edges of said support, a member detachably connected to said means, a pair of straight-edges pivotally attached to said member, a flexible element connected to said straight-edges at the ends opposite said pivots and forming a loop between said ends, a pair of means attachable to said support at spaced points thereon and adapted to engage said flexible element so as to keep the loop thereof in tension between said pair of straight-edge ends but freely shiftable relative to said pair of attachable means so as to automatically effect the variable divergent disposition of said straight-edges when said first-mentioned means is moved about said drafting surface, and other means mounted on said member and pressable into contact with said straight-edges to hold them against accidental movement during the drawing of a line therealong.

7. Drafting equipment of the class described comprising, a support providing a drafting surface, means mounted on said support and movable in a plane parallel to said drafting surface between opposite edges of said support, a pair of straight-edges pivotally attached to said means, other means attachable to said support at spaced points thereon, and a flexible element connecting said straight edges with said other means and forming a loop between the ends of said straight-edges and which element is kept in tension when said member is moved about said drafting surface.

8. Drafting equipment of the class described comprising, a support providing a drafting surface, means mounted on said support and movable in a plane parallel to said drafting surface between opposite edges of said support, a pair of straight-edges pivotally attached to said means, other means attachable to said support at spaced points thereon, and a coiled spring connecting said straight edges with said other means and forming a loop between the ends of said straight-edges and which spring is kept in tension when said member is moved about said drafting surface.

9. Drafting equipment of the class described comprising, a support providing a drafting surface, means mounted on said support and movable in a plane parallel to said drafting surface between opposite edges of said support, a pair of straight-edges pivotally attached to said means, other means attachable to said support at spaced points thereon, a coiled spring connecting said straight-edges with said other means and forming a loop between the ends of said straight-edges and which spring is kept in tension when said member is moved about said drafting surface, and other means mounted on said first-mentioned means and pressable into contact with said straight-edges to hold them against accidental movement during the drawing of a line therealong.

10. Drafting equipment of the class described comprising, a support providing a drafting surface, means mounted on said support and movable in a plane parallel to said drafting surface between opposite edges of said support, a pair of straight-edges pivotally attached to said means, other means attachable to said support at spaced points thereon, a coiled spring connecting said straight-edges with said other means and forming a loop between the ends of said straight-edges and which spring is kept in tension when said member is moved about said drafting surface, said other means mounted on said first-mentioned means and selectively pressable into contact with said straight-edges to hold each against accidental movement during the drawing of a line therealong.

11. Drafting equipment of the class described comprising, a member mountable on a means attached to a drafting surface support and movable in a plane parallel to said drafting surface, a pair of straight-edges pivotally attached to said member, a flexible element connected to the ends of said straight-edges and forming a loop between the ends thereof and adapted for attachment to a pair of means on said support whereby said element is kept in tension when said member is moved about said drafting surface.

12. Drafting equipment of the class described comprising, a member mountable on a means attached to a drafting surface support and movable in a plane parallel to said drafting surface, a pair of straight-edges pivotally attached to said member, a flexible element connected to the ends of said straight-edges and forming a loop between the ends thereof and adapted for connection to means attachable to said support at spaced points whereby said loop is maintained in tension between said pair of straight-edge ends but freely shiftable relative to said attachment means when said first-mentioned means is moved about said drafting surface.

EDMUND E. HURST.
JOHN WARREN PAXTON.

REFERENCES CITED

The following references are of record in the file of this patent:

UNITED STATES PATENTS

| Number | Name | Date |
|---|---|---|
| 370,409 | Podgorski | Sept. 27, 1887 |
| 563,931 | Laughlin | July 14, 1896 |
| 1,918,216 | Sachtleber | July 11, 1933 |
| 2,275,251 | Delisle | Mar. 3, 1942 |
| 2,332,967 | Fatkin | Oct. 26, 1943 |
| 2,380,073 | Robinson | July 10, 1945 |